United States Patent
Vladimir et al.

(10) Patent No.: US 9,245,175 B1
(45) Date of Patent: Jan. 26, 2016

(54) IMAGE CAPTURE AND INDIVIDUAL VERIFICATION SECURITY SYSTEM INTEGRATING USER-WORN DISPLAY COMPONENTS AND COMMUNICATION TECHNOLOGIES

(71) Applicant: ROCKWELL COLLINS, INC., Cedar Rapids, IA (US)

(72) Inventors: Alex Vladimir, Laurel, MD (US); Rolf R. Stefani, West River, MD (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/520,248

(22) Filed: Oct. 21, 2014

(51) Int. Cl.
| | | |
|---|---|---|
| G06K 9/00 | (2006.01) | |
| G05B 19/00 | (2006.01) | |
| G06F 21/00 | (2013.01) | |

(52) U.S. Cl.
CPC ........ G06K 9/00295 (2013.01); G06K 9/00281 (2013.01); G06K 9/00778 (2013.01)

(58) Field of Classification Search
CPC .......... G06K 9/00295; G06K 9/00281; G06K 9/00778; G06K 9/00228; G06K 9/00221; G06K 9/00288; G06K 9/00248
USPC ......... 382/100, 118, 115, 116, 124, 181, 209, 382/217, 218; 713/186, 182, 185, 168; 340/5.8, 5.81, 5.82, 5.2, 5.52, 5.53, 340/5.83; 704/270, 273, 231, 246; 726/2, 3, 726/5, 6
See application file for complete search history.

(56) References Cited

U.S. PATENT DOCUMENTS

| | | | | |
|---|---|---|---|---|
| 6,698,653 | B1* | 3/2004 | Diamond | G07C 9/00087 235/375 |
| 7,092,555 | B2* | 8/2006 | Lee | G06K 9/00288 382/118 |
| 7,646,887 | B2* | 1/2010 | Goncalves | G06K 9/3233 235/383 |
| 8,851,372 | B2* | 10/2014 | Zhou | G06F 1/163 235/380 |
| 2001/0040986 | A1* | 11/2001 | Farringdon | G06F 15/025 382/118 |
| 2001/0056349 | A1* | 12/2001 | St. John | G07C 9/00158 704/270 |
| 2003/0159040 | A1* | 8/2003 | Hashimoto | G06F 21/35 713/168 |
| 2009/0322866 | A1* | 12/2009 | Stotz | G07C 9/00087 348/77 |
| 2013/0070974 | A1 | 3/2013 | Stefani | |
| 2014/0267299 | A1* | 9/2014 | Couse | G06T 11/206 345/440.2 |

* cited by examiner

Primary Examiner — Sheela C Chawan
(74) Attorney, Agent, or Firm — Angel N. Gerdzhikov; Donna P. Suchy; Daniel M. Barbieri

(57) ABSTRACT

A system and method are provided for integrating user-worn display components and communication technologies into image capture and individual verification security systems. User-worn input/output (I/O) devices are employed to streamline the security screening procedures that continue to require human interaction for visual identification of participating individuals entering secure areas, particularly in large numbers. Individual access credentials and/or permissions are verified for individuals initially upon entry within the facility, and discernible physical feature recognition information, including facial recognition information, to be associated with the access verification for the individuals is collected. The user-worn I/O devices are used by security and screening personnel to observe discernible physical features of individuals presenting themselves at one or more internal security or limited access checkpoints and to initiate comparison analysis of the observed discernible physical features with stored discernible physical feature recognition information to expedite clearance and/or verification procedures.

20 Claims, 2 Drawing Sheets

IMAGE CAPTURE AND INDIVIDUAL VERIFICATION SECURITY SYSTEM INTEGRATING USER-WORN DISPLAY COMPONENTS AND COMMUNICATION TECHNOLOGIES

This application is related to U.S. patent application Ser. No. 13/621,390 to Rolf STEFANI, filed Sep. 17, 2012 and published as U.S. Patent Application Publication No. 2013/0070974 A1 (the 974 publication) on Mar. 21, 2013, the entire disclosure of which is hereby incorporated by reference herein in their entirety.

BACKGROUND

1. Field of the Disclosed Embodiments

This disclosure relates to systems and methods for integrating user-worn display components and communication technologies into image capture and individual verification security systems.

2. Related Art

World events have led to ever increasing vigilance in controlling access to spaces, equipment, and devices. This increased vigilance has led to large numbers of increasingly-sophisticated clearance procedures for authorizing such access. Implementation of these increasingly sophisticated security procedures, particularly those that require human intervention or human interaction, tend to significantly increase bottlenecks and delays where the clearance or access of large numbers of individuals needs to be cleared through a particular checkpoint.

Certain proprietary clearance systems incorporate technologies and automation to streamline clearance procedures. One example is the Rockwell Collins ARINC VeriPax™ system which is advertised as follows. Facing more overcrowding and greater operational challenges than ever before, airports need solutions that move passengers as quickly and efficiently as possible while accommodating evolving security requirements and new International Air Transport Association (IATA) initiatives. Rockwell Collins' ARINC Passenger Reconciliation System (PRS)—VeriPax™—optimizes passenger flow at security checkpoints by complementing existing manual processes, enables the verification of flight and boarding pass information, and incorporates new initiatives in airport technology. VeriPax™ reads boarding passes using 2D barcode scanners, automatically screens passengers against airline host systems in real time, determines clearance and provides alerts to security personnel and agents when necessary.

Systems such as VeriPax™ are intended to combat the security and passenger frustration challenges of the modern airport environment, by increasing security while simplifying security verification processes enhancing overall operational efficiency. With this, and like, systems all efforts have been made to accelerate procedures for clearing individual passengers through security screening checkpoints in busy and often overwhelmed airport environments. These efforts may provide a model for access clearance to other spaces and/or facilities.

SUMMARY OF THE DISCLOSED SUBJECT MATTER

Facial recognition systems are used in conjunction with individual clearance procedures in a number of personnel security and screening scenarios including in conjunction with verifying boarding passes at many airports. The 974 publication is directed to a method and apparatus for tracking passenger movement through a travel facility. The system disclosed in the 974 publication receives captured facial recognition features of passengers using a first facial recognition camera at a first known location. A determination is made as to whether the captured facial recognition features of the passengers are stored in a database. If the captured facial recognition features of any of the passengers are determined not to be stored in the database, the system in the 974 publication starts a timer. When captured facial recognition features of the previously not on file passenger are captured using a second facial recognition camera at a second known location the timer is stopped. An amount of elapsed time between the received captured facial recognition features of the passenger using the first facial recognition camera at the first known location and the receiving captured facial recognition features of the passenger using the second facial recognition camera at the second known location is determined and output to at least one of one or more travel facility display devices, one or more administrative display devices, and one or more user display devices for personnel tracking through the airport facility.

Despite all efforts at the incorporation of technology into the security screening processes, delays continue to exist in clearing passengers and other personnel through individual security checkpoints that continue to require, at a minimum, some visual verification of the individual passengers and the individual passengers' identification materials. While significantly automated, procedures requiring human interaction and/or human verification of an identity of individuals presenting themselves and their credentials continue to create bottlenecks where the requirement remains to visually verify identities of large numbers of individuals including, for example, at airline and/or airport security screening checkpoints.

It would be advantageous to integrate additional technologies and communication capabilities in an effort to further streamline the security screening procedures that continue to require human interaction for visual identification of participating individuals entering secure areas, particularly in large numbers.

Exemplary embodiments of the systems and methods according to this disclosure may provide, in association with a limited access facility, or a facility having certain limited access areas, an ability to verify credentials, and/or access permissions, for a plurality of individuals initially upon entry within the facility and to collect discernible physical feature recognition information, including facial recognition information, to be associated with the access verification for the plurality of individuals.

Exemplary embodiments may associate with each combination of access verification and discernible physical feature recognition information for each of the plurality of individuals a determined or specified period of accessibility for each of the plurality of individuals. These periods may be purely time controlled or may be event driven.

Exemplary embodiments may store, in one or more databases, access verification entries for each of the plurality of individuals. Each access verification entry may include at least an identification of the individual, a set of access permissions for the individual, discernible physical feature recognition information for the individual, and a determined or specified period of accessibility for the individual.

Exemplary embodiments may provide a capacity by which the discernible physical feature recognition information for the individuals collected in the one or more databases may be queried and compared to observed discernible physical features of individuals presenting themselves to security or screening personnel at one or more internal security or limited access checkpoints within the facility to expedite clearance procedures.

Exemplary embodiments may integrate user-worn input/output (I/O) devices worn by one or more of the security or screening personnel to provide identification of observed discernible physical features for individuals, automated queries of the databases to verify access permissions for the individuals according to the observed discernible physical features for the individuals, and to automatically generate and display access authorization or non-authorization to the security or screening personnel using a display component of the user-worn I/O devices.

Exemplary embodiments may provide, in association with each registered entry in the one or more databases, a particular time at which the registered entry may be automatically purged from the database. Such a methodology may provide a capacity by which multiple entries in the one or more databases may be limited in a manner that eases the burden of the human interactive security review. This feature may provide that a concise set of verified individual access data is maintained that may be required to be searched at any given time. This feature may, therefore, increase the speed by which facial recognition and individual verification of a large number of individuals seeking access or screening may be undertaken.

Exemplary embodiments may associate additional information with registered individuals to include access to, for example, certain additionally-restricted areas within the facility, or certain limited access amenities.

In embodiments in an airport scenario, a plurality of individuals may be registered to the one or more databases when they check in at any one of a check-in counter, baggage drop, boarding pass recovery kiosk, or other like registration checkpoint in the airport. As the individuals then proceed through the airport, access to particular areas beyond security and screening checkpoints may be immediately verifiable based on security or screening personnel observing the individuals with user-worn I/O devices, the user-worn I/O devices observing discernible physical characteristics such as facial recognition for the individuals and communicating directly with the one or more databases to compare observed information with stored information. The user-worn I/O devices may then receive and display an indication of accessibility or access denial for each of the individuals in an automated manner that does not require additional interaction and/or verification of each individual's level of access. With additional information, accessibility to airport lounges and/or other amenities that are reserved for a certain subset of the passenger population may be easily verified by check-in personnel at those lounges or controlling those other amenities in a like manner by automatically querying a database with observed physical feature recognition information for comparison.

Exemplary embodiments may result in expediting and/or streamlining clearance and/or access verification procedures, particularly at points within the facility where security or screening verification procedures tend to create bottlenecks, such as, for example, at security screening checkpoints in airports. When a particular individual is determined by the automated systems as being access verified, that particular individual is allowed to pass through the security checkpoint in an expedited manner. When a particular individual is determined by the automated systems as being access denied, the individual security personnel may then manually review the individual's access and provide clearance through the security screening checkpoint, or otherwise ultimately deny access, according to conventional methods.

Exemplary embodiments may enhance security by ensuring that the individual that is being cleared through a particular security screening checkpoint based on associated information is the same individual that checked in at one or more of the check-in nodes specified above. In embodiments, security is enhanced based on a decreased incidence for the individual verification schemes to suffer from instances of human error introduced by mistakes on a part of one or more of the security or screening personnel.

These and other features and advantages of the disclosed systems and methods are described in, or apparent from, the following detailed description of various exemplary embodiments.

BRIEF DESCRIPTION OF THE DRAWINGS

Various exemplary embodiments of the disclosed systems and methods for integrating user-worn display components and communication technologies into image capture and individual verification security systems, will be described, in detail, with reference to the following drawings, in which.

DESCRIPTION OF THE DISCLOSED EMBODIMENTS

Figure 1:
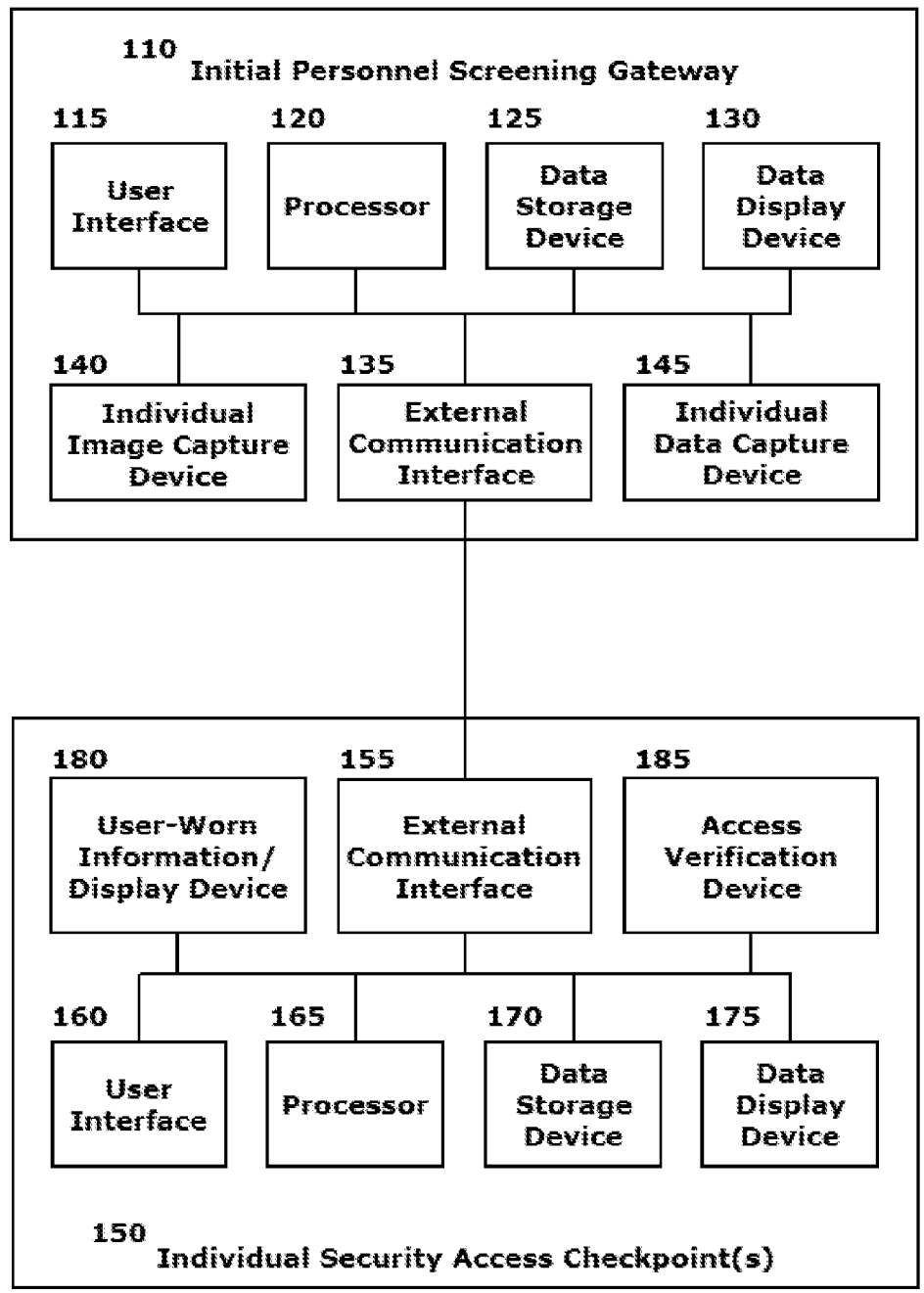
FIG. 1 illustrates an exemplary operating system for integrating user-worn display components and communication technologies into image capture and individual verification security systems according to this disclosure.

The disclosed systems and methods for integrating user-worn display components and communication technologies into image capture and individual verification security systems, including in an airport operating environment, will generally refer to this specific utility for those systems and methods. Exemplary embodiments will be described in this disclosure as being particularly adaptable to use in airport security and access screening checkpoints. These descriptions should not be interpreted as specifically limiting the disclosed schemes to any particular security and access screening scenario and/or to any particular configuration of a system for granting or denying individual access to, or within, any access-controlled facility. In fact, the systems and methods according to this disclosure may be equally applicable to any person-in-the-loop security procedures for gaining access to controlled facilities, or to controlled spaces within the facilities. Any such access verification scenario is contemplated as being covered by the systems and methods according to this disclosure.

Specific reference to, for example, a scenario for security screening and clearance of individual airline passengers at security and screening checkpoints in airports as providing a particular example of where the systems and methods according to this disclosure may be particularly advantageously employed should be understood as being exemplary only, and not limiting the disclosed schemes, in any manner, to any particular class of access control units or processes, or to any particular communication link or protocol for implementing the disclosed schemes.

Features and advantages of the disclosed embodiments will be set forth in the description that follows, and in part will be obvious from the description, or may be learned by practice of the disclosed embodiments. The features and advantages of the disclosed embodiments may be realized and obtained by means of the instruments and combinations of features particularly pointed out in the appended claims.

Various disclosed embodiments are discussed in detail below. While specific implementations are discussed, it should be understood that this is done for illustration purposes only. A person skilled in the relevant art will recognize that other components and configurations may be used without departing from the spirit and scope of the disclosed embodiments.

The disclosed schemes may integrate new, wearable display and communication devices, like user-worn I/O devices, with existing systems, such as VeriPax™. The capabilities of new technologies may be exploited to provide near real-time facial image capture, data communication and user feedback display to enable much faster and much more secure processing of large numbers of individuals seeking access to a particular area, including airline passengers at airport security and screening checkpoints and other like travel hubs. The disclosed schemes may provide additional security and traveler assistance as individuals are subject to routine and updated screening as the individuals move throughout the travel facility.

The disclosed systems may allow for security and screening personnel, such as agents or officers, wearing the user-worn I/O devices, incorporating display and communication technologies, to immediately identify individuals (passengers) by their observed discernible physical features, such as facial images, with corresponding information temporarily captured and saved in a database. The database may include, for example, facial biometric information previously captured at a controlled travel station (such as an airport or train station) initial access point or user-interactive registration point.

The security and screening personnel, via the user-worn I/O devices, may execute an image comparison application, receive an indication of access verification or denial and may also, via the user-worn I/O devices, recall other associated information regarding a travel status of an individual, such as, for example, a departure location or a delay status.

Discernible physical feature recognition information, including facial biometrics, may be recorded at a first visible passenger touch point, e.g. a check-in desk/counter, a baggage drop, a boarding pass dispensing kiosk, an initial security desk and/or other like fixed position that may be supplemented with an image capture device, such as, for example, a facial recognition feature collecting camera. In embodiments, discernible physical feature recognition information may be separately uploaded by an airline passenger online prior to entering the travel station.

At any point, security or screening personnel, such as an agent or office, wearing a user-worn I/O device or similar display technology and observing individuals, including individual faces, may receive near real-time feedback about an access status of each of the individuals including issuing an allowed or denied status for the individuals via a display component in the user-worn I/O device.

New wearable technology components, as well as faster networking and computing speeds, may provide an opportunity to enhance existing automated security and screening products, some of which, such as VeriPax™, are already effectively deployed in airports to provide increasingly more effective capabilities that will promote usability and productivity, reduce cost and enhance security at locations where current automated systems are deployed.

In the mass travel scenario, when a traveler is first seen at the travel facility, the traveler may register his or her facial biometrics. Options for facial biometric registration, as noted above, may be at the check-in desk or at any manner of a self service station, such as, for example, an automated ticket machine, a baggage check-in station, or an independent free-standing enrollment kiosk. The enrollment/registration information, including the facial biometric data, may then be stored in a central database.

As a traveler approaches security or screening personnel, such as an officer or agent, wearing a user-worn I/O device, or similar worn display technology with the disclosed system, a built-in camera system in the user-worn I/O device may scan a surrounding area for faces. A video display screen may display a live video feed. When a face is detected approaching the security or screening personnel, an image of the face may be captured and the system may automatically communicate with, and search, the database for a known match of that face. If no match is found, the face may be flagged as "unknown." The system may indicate a status by any usable and easily interpreted visual alert or cuing in the display component of the user-worn I/O device such as drawing, for example, a white box around a person's face on the video screen or image that is to be displayed on the user's device, and also indicate that the person is not known to the system with additional text (such as the word "unknown"). If a match is found, the system may then pull the travel documents for the identified (matched) traveler (pre-enrolled in the above step) and perform any series of security checks, configurable by the system administrative operator, including a facility operator, an airport authority, a transport provider or the like. Examples of security checks may include, but are not limited to:

Verifying that a traveler is at a correct departure location;
Verifying that the traveler is present at the correct date;
Verifying that the traveler is present within an allotted time window;
Verifying that the traveler processes a valid ticket through communication with the transport provider; and/or
Verifying that the traveler is not on any watch list or known no-travel list. If the traveler passes all of the applicable checks, the system may indicate clearance on the video screen by drawing, for example, a green box around the traveler's face along with the traveler's name and other pertinent information.

If the traveler is rejected or flagged for any reason above, the system may indicate rejection or provisional access denial on the video screen with a red box and the traveler's name. Additional information, such as a reason for rejection, may be displayed on a separate portion of the display screen.

An ability to quickly inform security representatives at widely diverse security, screening or access points, including separate security and screening checkpoints in airports, may assist in reducing bottlenecks, eliminating confusion, and generally streamlining the security and screening processes by which individuals may be ushered through the system.

Those of skill in the art will recognize that the disclosed schemes may be applicable to access to other transportation modalities including rail transit and/or cruise ships, as examples. The disclosed schemes may also be applicable to access to secure spaces that are intended to be accessed by individuals from many and widely disparate entities including, for example, law enforcement entities or separately-secured and screened entities.

FIG. 1 illustrates an exemplary operating system 100 for integrating user-worn display components and communication technologies into image capture and individual verification security systems according to this disclosure. As shown in FIG. 1, the exemplary operating system 100 may be provided to integrate collection of individual personnel access verification information at an initial personnel screening gateway 110 with streamlined individual personnel access authorizations throughout a facility undertaken at one or more individual security access checkpoints 150.

The initial personnel screening gateway 110 may include a user interface 115 by which a user may input information specific to individual access verification for the facility. The user interface 115 may comprise any commonly-known apparatus by which to input information to a computing and/or communicating system including, but not limited to, a keyboard, a touch screen display device, and the like.

The initial personnel screening gateway 110 may include one or more processors 120 for undertaking processing and control functions for collecting information specific to individual access verification and for separately storing that information in one or more data storage devices 125. The one or more data storage devices 125 may be provided to store operating programs for the initial personnel screening gateway 110 and/or to store databases of information including individual personnel identification information, and other collected information regarding the individual as described in greater detail below. Although shown as integral to the initial personal screening gateway 110, the data storage devices 125 may be dispersed data storage components with which the initial personnel security screening gateway 110 may be in wired or wireless communication. The data storage devices 125 may include any manner of updatable data storage device to include cloud-based data storage locations. The data display device 130 may be provided in order that a user of the initial personnel screening gateway 110 may verify collected information regarding the individual and oversee the storage of that information in one or more data storage devices 125.

The initial personnel screening gateway 110 may include an individual image capture device 140, which may be in the form of a camera. The individual image capture device 140 may be employed to collect discernible physical feature recognition information for the individual to be associated with the individual personnel identification information for the individual. The discernible physical feature recognition information may include, but not be limited to, facial recognition information that is employed in the processor executing a facial recognition application to provide usable data regarding the discernible physical feature recognition information. An overview of the use of such facial recognition information in a mass travel security scenario is described in greater detail in the 974 publication.

The initial personnel screening gateway 110 may include an individual data capture device 145. The individual data capture device 145 may take the form of a 2D barcode or glyph reader that may be usable to read identification documents, travel documents (including tickets and/or boarding passes) or other relevant data-providing documents in order to associate additional accumulated information regarding, for example, a reason for the individual access to the facility, or to a particular portion of the facility including an airport and/or a particular departure or arrival gate within the airport. The information recovered by the individual data capture device 145 may include event information that will specify a termination of a period of accessibility to the facility. The processor 120 may use this information regarding the period of accessibility, or other period of accessibility information that may be input via the user interface 115, to specify a time at which an individual's access authorization may be purged from the database in the data storage device 125.

As indicated above then, the initial personnel screening gateway 110 may be used to collect user-input information or data-captured information regarding an identification of a particular individual seeking access to the facility, or to a portion of the facility. The initial personnel screening gateway 110 may also be used to collect discernible physical feature recognition information for the individual. The initial personnel screening gateway 110 may also be used to, in some manner, define a period of accessibility for the individual to the facility or to the portion of the facility. A data entry may then be generated and stored in a database in one or more data storage devices 125 that specifies personnel identification and/or verification information along with captured discernible physical feature recognition information and period of accessibility information, along with any additional information that may be pertinent to an individual's access verification to the facility, or to a portion of the facility. As each specified or determined period of accessibility for each individual access verification entry stored in a database expires, the processor 120 may purge that individual access verification entry.

The initial personnel screening gateway 110 may include at least one external communication interface 135 for providing access of the one or more individual security access checkpoints 150 to information collected and stored in the initial personnel screening gateway 110. As indicated briefly above, to any extent the data storage occurs in a separate data storage device, the external communication interface 135 may be used as a communication conduit to provide data entries to, and to retrieve data from, those separate data storage devices.

The individual security access checkpoints 150 may include an external communication interface 155, which may provide a wired or wireless communication capacity for the individual security access checkpoints 150 to communicate with the initial personnel screening gateway 110, and/or any dispersed data storage devices in which individual access verification databases are stored. The user interface 160, processor 165, data storage device 170 and data display device 175 may be locally provided at individual security, screening or access checkpoints to operate and provide functions such as those provided in corresponding elements as described above for the initial personnel screening gateway 110 within the facility.

Preferable implementing technologies according to the embodiments of this disclosure may include user-worn information/display devices 180, such as, for example, Google® Glass, by which security and screening personnel may observe individuals approaching their particular security or screening checkpoint. Employing such user-worn information/display devices 180, the security and screening personnel may observe discernible physical features of those approaching individuals, including facial recognition features, communicate the observed discernible physical features to an access verification device 185 that then conducts a comparative matching of the observed discernible physical features with database stored information regarding discernible physical feature recognition information of registered and/or access verified individuals. Results of the comparative matching may be returned from the access verification device 185 to the display component of the user-worn information/display device 180 in a manner that will immediately provide to the security and screening personnel wearing the user-worn information/display device 180 information regarding the access status of the observed individual.

All of the various components of the exemplary operating system 100, as depicted in FIG. 1, may be connected internally and to each other by one or more data/control busses.

These data/control busses may provide wired or wireless communication between the various components of the exemplary operating system 100, understanding that all of those components comprise a dispersed system in an overarching individual security/access verification and information sharing network, as depicted.

It should be appreciated that the various disclosed elements of the exemplary operating system 100 may be arranged in any combination of sub-systems as individual components or combinations of components, integral to a single unit or as separate units. In other words, no specific configuration as an integral unit or as a support unit is to be implied by the depiction in FIG. 1. Further, although depicted as individual units for ease of understanding of the details provided in this disclosure regarding the exemplary operating system 100, it should be understood that the described functions of any of the individually-depicted components may be undertaken, for example, by one or more processors connected to, and in communication with, one or more data storage device(s), all of which may support operations in the associated access verification and communication schemes and tools.

Figure 2:
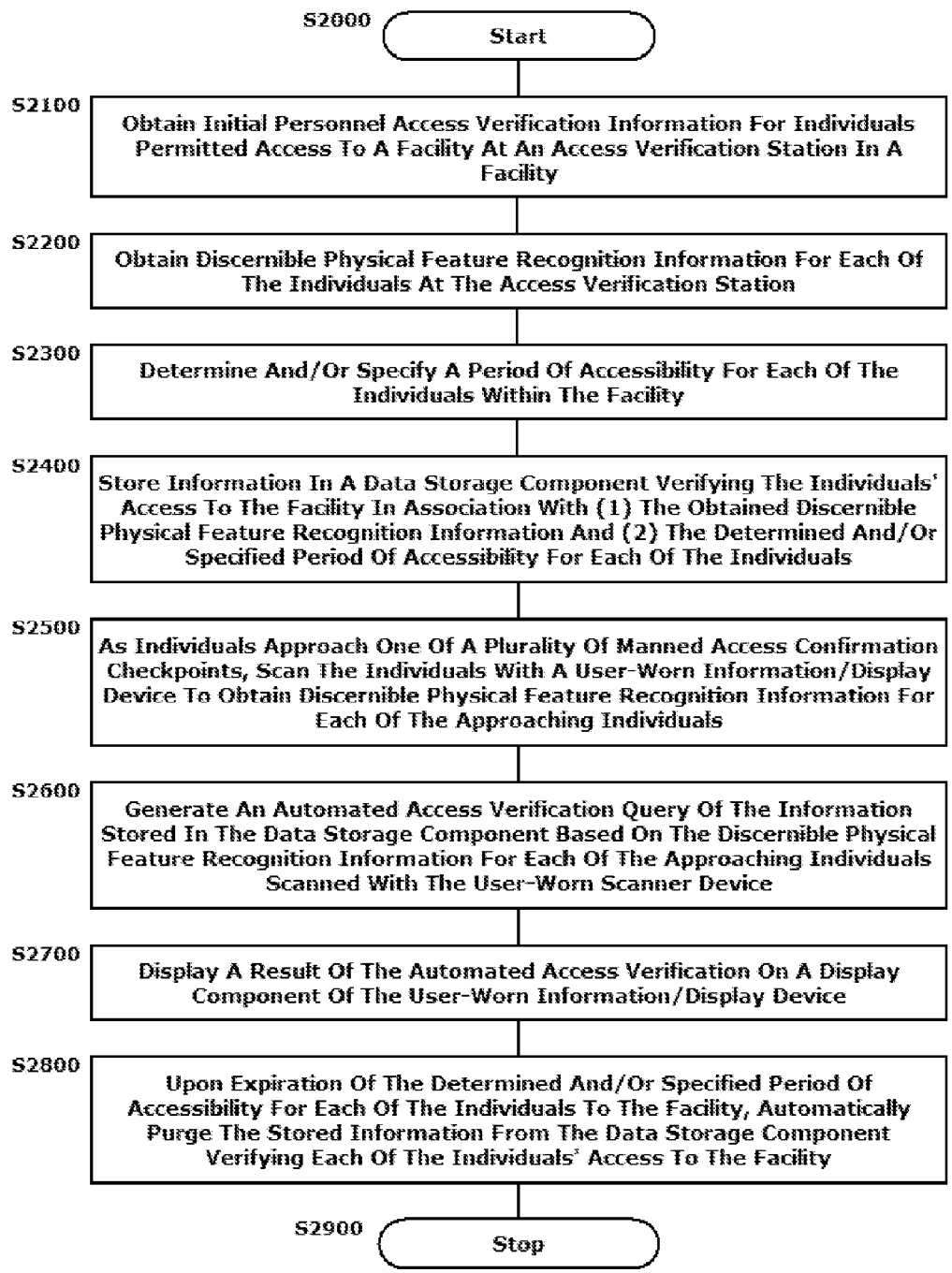
FIG. 2 illustrates a flowchart of an exemplary method for integrating user-worn display components and communication technologies into image capture and individual verification security systems according to this disclosure.

The disclosed embodiments may include an exemplary method for integrating user-worn display components and communication technologies into image capture and individual verification security systems. FIG. 2 illustrates an exemplary flowchart of such a method. As shown in FIG. 2, operation of the method commences at Step S2000 and proceeds to Step S2100.

In Step S2100, initial personnel access verification information for individuals permitted access to a facility may be obtained at an access verification station in the facility. Such access verification stations may include any fixed location within the facility at which an individual may enter information regarding his or her access to the facility. The individual personnel access verification information obtained at the access verification station may be entered, for example, via a manual user interface, or may be read from documents including security credentials of the individual and/or travel documents for the individual. Operation the method proceeds to Step S2200.

In Step S2200, discernible physical feature recognition information may be collected for the individual via, for example, an imaging device including a facial recognition imaging device. Other biometric data to be associated with the individual personnel access verification information may be collected via other conventional means. Operation of the method proceeds to Step S2300.

In Step S2300, a period of accessibility for each individual within the facility may be determined and/or specified. Such period of accessibility to be associated with the obtained individual personnel access verification information may include simply a clock time at which accessibility ends, or the termination of the period of accessibility may be associated with an occurrence of a particular event which may be otherwise monitored, and upon completion may determine the end of the period of accessibility for the individual. Such an event may be, for example, the departure of an airline aircraft on which the individual is a passenger. Operation of the method proceeds to Step S2400.

In Step S2400, a data entry may be stored in a data storage component that combines the obtained individual personnel access verification information verifying a particular individual's access to the facility in association with the obtained discernible physical feature recognition information for the individual and the determined and/or specified period of accessibility for the individual to the facility. Operation of the method proceeds to Step S2500.

In Step S2500, as individuals approach one of a plurality of manned access confirmation (security and screening) checkpoints throughout the facility, individual security and screening personnel may scan the individuals with a user-worn information/display device to obtain observed discernible physical feature information for one or more of the approaching individuals. Operation of the method proceeds to Step S2600.

In Step S2600, an automated access verification query may be generated. The automated access verification query may employ the observed discernible physical feature information for a comparative analysis with obtained discernible physical feature recognition information previously collected for individuals in association with those individuals' personnel security verification information stored in one or more databases. Operation of the method proceeds to Step S2700.

In Step S2700, a result of the automated access verification (comparative analysis) may be displayed on the display component of the user-worn information/display device in any reasonably recognizable manner that provides the security and screening personnel wearing the user-worn information/display device with an indication of accessibility of the approaching individual. In instances where the comparative analysis returns a positive result indicating that the individual is provided access to areas beyond the security or screening checkpoint, the individual may be simply allowed to pass through the security or screening checkpoint. In instances where the comparative analysis returns a negative result indicating that the individual is to be denied access to areas beyond the security or screening checkpoint, the security and screening personnel may undertake manual access verification in a manner conventionally employed. A net result of these efforts is expected to provide a streamlined security and/or access screening for a large percentage of individuals attempting to obtain access to a portion of a facility, such as an airport, beyond a security or screening checkpoint. Operation of the method proceeds to Step S2800.

In Step S2800, upon expiration of the determined and/or specified period of accessibility for each of the individuals to the facility, and automatic purge of the stored information regarding the individual access verification will be undertaken from the data storage component. In this regard, searchable databases for current access to a facility, or areas within that facility, will be carefully controlled in an automated manner that will result in reduced computing overhead to expedite the comparative analysis of observed discernible physical features for individuals as they migrate through the different parts of the facility including passing through security and screening checkpoints to obtain access to different areas within the facility. Operation of the method proceeds to Step S2900, where operation of the method ceases.

The disclosed embodiments may include a non-transitory computer-readable medium storing instructions which, when executed by a processor, may cause the processor to execute all, or at least some, of the functions that may be appropriate to implement the steps of the method outlined above.

The above-described exemplary systems and methods reference certain conventional components, and certain newly-introduced technologic components, to provide a brief, general description of suitable operating environments in which the subject matter of this disclosure may be implemented for familiarity and ease of understanding. Although not required, embodiments of the disclosed systems, and implementations of the disclosed methods, may be provided and executed, at least in part, in a form of hardware circuits, firmware, or software computer-executable instructions to carry out the specific functions described. These may include individual program modules executed by one or more processors. Generally, program modules include routine programs, objects, components, data structures, and the like that perform particular tasks or implement particular data types in support of the overall objective of the systems and methods according to this disclosure.

Those skilled in the art will appreciate that other embodiments of the disclosed subject matter may be practiced in integrating access control techniques using many and widely-varied system components.

As indicated above, embodiments within the scope of this disclosure may also include computer-readable media having stored computer-executable instructions or data structures that can be accessed, read and executed by one or more processors in differing devices, as described. Such computer-readable media can be any available media that can be accessed by a processor, general purpose or special purpose computer. By way of example, and not limitation, such computer-readable media can comprise RAM, ROM, EEPROM, CD-ROM, flash drives, data memory cards or other analog or digital data storage device that can be used to carry or store desired program elements or steps in the form of accessible computer-executable instructions or data structures. When information is transferred or provided over a network or another communication connection, whether wired, wireless, or in some combination of the two, the receiving processor properly views the connection as a computer-readable medium. Thus, any such connection is properly termed a computer-readable medium. Combinations of the above should also be included within the scope of the computer-readable media for the purposes of this disclosure.

Computer-executable instructions include, for example, non-transitory instructions and data that can be executed and accessed respectively to cause a processor to perform certain of the above-specified functions, individually or in various combinations. Computer-executable instructions may also include program modules that are remotely stored for access and execution by a processor.

The exemplary depicted sequence of executable instructions or associated data structures represent one example of a corresponding sequence of acts for implementing the functions described in the steps of the above-outlined exemplary method. The exemplary depicted steps may be executed in any reasonable order to carry into effect the objectives of the disclosed embodiments. No particular order to the disclosed steps of the method is necessarily implied by the depiction in FIG. 2, except where execution of a particular method step is a necessary precondition to execution of any other method step.

Although the above description may contain specific details, they should not be construed as limiting the claims in any way. Other configurations of the described embodiments of the disclosed systems and methods are part of the scope of this disclosure. It will be appreciated that various of the above-disclosed and other features and functions, or alternatives thereof, may be desirably combined into many other different systems or applications. Although the above description may contain specific details, they should not be construed as limiting the claims in any way. Other configurations are part of the scope of the disclosed embodiments. For example, the principles of the disclosed embodiments may be applied to each individual security access checkpoint at which one or more security and screening individuals may employ a user-worn information/display device. This enables each security and screening checkpoint and/or database to enjoy the benefits of the disclosed embodiments even if any one of the large number of possible end-user nodes (security and screening checkpoints) do not need some portion of the described functionality. In other words, there may be multiple instances of the disclosed system each processing the content in various possible ways. It does not necessarily need to be one system used by all end-user nodes. Accordingly, the appended claims and their legal equivalents should only define the disclosed embodiments, rather than any specific examples given.

We claim:

1. A system for implementing access control, comprising:
 a database storing access verification information for individuals within a facility, individual access verification information entries comprising identification of an individual, access authorization for the individual within the facility, and discernible physical feature recognition information for the individual;
 a user-worn device for observing a plurality of individuals transiting areas of the facility, the user-worn device recording observed discernible physical features for the plurality of individuals; and
 an access resolution device that
  receives information from the user-worn device regarding the observed discernible physical features of the plurality of individuals;
  compares the received information regarding the discernible physical features for at least one of the plurality of individuals with the discernible physical feature recognition information for one or more individual stored as a part of the access verification information for individuals in the database; and
  returns an indication to the user-worn device regarding verification of access for the at least one of the plurality of individuals.

2. The system of claim 1, further comprising an access verification information capture device for collecting the access verification information for the individuals.

3. The system of claim 2, the access verification information device comprising:
 a data input device for receiving identification information and access authorization information for the individual; and
 an image capture device for capturing an image of the individual for extracting discernible physical feature recognition information for the individual,
 the discernible physical feature recognition information for the individual being associated with the received identification information and access authorization information for the individual and stored in the database.

4. The system of claim 1, each access verification information entry further comprising a period of accessibility for the individual within the facility, the access resolution device purging the access verification information for the individual at an expiration of the period of accessibility for the individual.

5. The system of claim 4, the period of accessibility being defined according to one of an elapsed time or occurrence of a monitored event in the facility.

6. The system of claim 1, the discernible physical feature recognition information being facial recognition information for the individual.

7. The system of claim 1, the returned indication to the user-worn device including a color coded display for each observed individual as to a status of the verification of access for the individual.

8. The system of claim 7, the status of the verification of the access for the individual being an explicit indication of access authorized, access denied or status unknown.

9. The system of claim 7, the returned indication to the user-worn device being supplemented with other information regarding at least one of identification of the individual and information related to access verification for the individual.

10. The system of claim 1, the facility being an airport and the user-worn device being employed by security and screening personnel at one or more security or screening checkpoints within the airport.

11. A method for implementing access control, comprising:
   storing access verification information for individuals within a facility in a database, individual access verification information entries comprising identification of an individual, access authorization for the individual within the facility, and discernible physical feature recognition information for the individual;
   employing a user-worn device to observe a plurality of individuals transiting areas of the facility, the user-worn device recording observed discernible physical features for the plurality of individuals; and
   receiving, with a processor, information from the user-worn device regarding the observed discernible physical features of the plurality of individuals;
   comparing, with the processor, the received information regarding the discernible physical features for at least one of the plurality of individuals with the discernible physical feature recognition information for one or more individual stored as a part of the access verification information for individuals in the database; and
   returning, with the processor, an indication to the user-worn device regarding verification of access for the at least one of the plurality of individuals.

12. The method of claim 11, further comprising collecting the access verification information for the individuals with an access verification information capture device that includes
   a data input device for receiving identification information and access authorization information for the individual; and
   an image capture device for capturing an image of the individual for extracting discernible physical feature recognition information for the individual,
   the discernible physical feature recognition information for the individual being associated with the received identification information and access authorization information for the individual and stored in the database.

13. The method of claim 11, each access verification information entry further comprising a period of accessibility for the individual within the facility, the processor purging the access verification information for the individual at an expiration of the period of accessibility for the individual,
   the period of accessibility being defined according to one of an elapsed time or occurrence of a monitored event in the facility.

14. The method of claim 11, the discernible physical feature recognition information being facial recognition information for the individual.

15. The method of claim 11, the returned indication to the user-worn device including a color coded display for each observed individual as to a status of the verification of access for the individual.

16. The method of claim 15, the status of the verification of the access for the individual being an explicit indication of access authorized, access denied or status unknown.

17. The method of claim 15, the returned indication to the user-worn device being supplemented with other information regarding at least one of identification of the individual and information related to access verification for the individual.

18. The method of claim 15, the returned indication to the user-worn device directing the conduct of other manual verification of access for the individual within the facility.

19. The method of claim 11, the facility being an airport and the user-worn device being employed by security and screening personnel at one or more security or screening checkpoints within the airport.

20. A non-transitory data storage medium storing instructions that, when executed by a processor, cause the processor to execute the steps of a method for implementing access control, the method comprising:
   storing access verification information for individuals within a facility in a database, individual access verification information entries comprising identification of an individual, access authorization for the individual within the facility, discernible physical feature recognition information for the individual, and a period of accessibility for the individual within the facility;
   receiving information from a user-worn device regarding observed discernible physical features of a plurality of individuals transiting areas of the facility captured by the user-worn device
   comparing the received information regarding the discernible physical features for at least one of the plurality of individuals observed with the user-worn device with the discernible physical feature recognition information for one or more individual stored as a part of the access verification information for individuals in the database;
   returning an indication to the user-worn device regarding verification of access for the at least one of the plurality of individuals;
   monitoring the period of accessibility for each individual access verification entry; and
   automatically purging from the database the access verification information for the individual at the expiration of the period of accessibility for the individual.

* * * * *